US009219560B2

(12) United States Patent
Hummel

(10) Patent No.: US 9,219,560 B2
(45) Date of Patent: Dec. 22, 2015

(54) MULTI-PROTOCOL SERDES PHY APPARATUS

(75) Inventor: Thomas F. Hummel, Natick, MA (US)

(73) Assignee: Cavium, Inc., San Jose, CA (US)

( * ) Notice: Subject to any disclaimer, the term of this patent is extended or adjusted under 35 U.S.C. 154(b) by 1093 days.

(21) Appl. No.: 13/280,841

(22) Filed: Oct. 25, 2011

(65) Prior Publication Data

US 2013/0101058 A1    Apr. 25, 2013

(51) Int. Cl.
*H04L 12/28* (2006.01)
*H04J 3/04* (2006.01)

(52) U.S. Cl.
CPC ....................................... *H04J 3/047* (2013.01)

(58) Field of Classification Search
None
See application file for complete search history.

(56) References Cited

U.S. PATENT DOCUMENTS

| | | | |
|---|---|---|---|
| 6,516,952 B1 * | 2/2003 | Wang et al. | 209/227 |
| 6,519,266 B1 * | 2/2003 | Manning et al. | 370/469 |
| 6,653,957 B1 | 11/2003 | Patterson | |
| 2002/0194415 A1 | 12/2002 | Lindsay | |
| 2003/0179709 A1 | 9/2003 | Huff | |
| 2004/0028156 A1 * | 2/2004 | Sefidvash et al. | 375/346 |
| 2004/0028158 A1 * | 2/2004 | Fujimori et al. | 375/350 |
| 2004/0028164 A1 * | 2/2004 | Jiang et al. | 375/371 |
| 2004/0030805 A1 * | 2/2004 | Fujimori et al. | 709/250 |
| 2004/0030968 A1 * | 2/2004 | Fan et al. | 714/704 |
| 2005/0281277 A1 * | 12/2005 | Killian | 370/412 |

FOREIGN PATENT DOCUMENTS

EP    2 075 982 A2    7/2009

OTHER PUBLICATIONS

"Single Chip 8 to 32-core OCTEON II™ MIPS64 Processors Provide up to 48 GHz of 64-bit Compute with Unmatched L3-L7 Data and Security Acceleration to Deliver 40Gbps of throughput While Slashing Power Consumption for Next Generation Internet Infrastructure Applications," *Cavium Network Unveils OCTEON II CN68XX—Industry's Highest-Performance Multi-Core Processors for Energy-Efficient Data Center, Mobile Internet and the Borderless Enterprise* (May 2010).
"Interlaken Protocol Definition, A Joint Specification of Cortina Systems and Cisco Systems, Revision 1.2", pp. 1-52 (2008).

(Continued)

*Primary Examiner* — Chi H Pham
*Assistant Examiner* — Fahmida Chowdhury
(74) *Attorney, Agent, or Firm* — Hamilton, Brook, Smith & Reynolds, P.C.

(57) ABSTRACT

In one embodiment, a multiprotocol interface includes a physical layer transmitter unit configured to transmit data from synchronous media access control layer units and asynchronous media access control layer units. The multiprotocol interface also includes a physical layer receiver unit configured to receive data and to deliver the received data to the synchronous media access control layer units and the asynchronous media access control layer units. The physical layer transmitter unit and the physical layer receiver unit are both configured to operate in either an asynchronous mode or a synchronous mode. The physical layer transmitter unit and the physical layer receiver unit transmit and receive only with the asynchronous media access control units, and physical layer transmitter unit and the physical layer receiver unit transmit and receive only with the synchronous media access control units.

18 Claims, 5 Drawing Sheets

SERDES PER-LANE TRANSMITTER BLOCK DIAGRAM

(56) References Cited

OTHER PUBLICATIONS

Morris, J., et al., "PHY Interface for the PCI Express Architecture, Draft Version 1.97," *Intel Corporation*:1-38 (2006).

International Search Report and Written Opinion in International Application No. PCT/US2012/057279, mailed Dec. 14, 2012.
International Preliminary Report on Patentability from PCT/US2012/057279 dated May 8, 2014 entitled "Multi-Protocol Serdes Phy Apparatus".

* cited by examiner

SERDES PER-LANE TRANSMITTER BLOCK DIAGRAM

SERDES PER-LANE RECEIVER BLOCK DIAGRAM

MULTI-PROTOCOL SERDES PHY APPARATUS

BACKGROUND

Physical Layer Units (PHYs) support various high-speed Serialize/Deserialize (SerDes) interfaces. SerDes interfaces are commonly used in networking devices to assist receiving and transmitting data. SerDes interfaces include a serializer block and a deserializer block. The serializer block generally converts data from a parallel format to a serial format. The deserializer block generally converts data from a serial format to a parallel format.

SUMMARY

In one embodiment, a multiprotocol interface includes a physical layer transmitter unit configured to transmit data from synchronous media access control layer units and asynchronous media access control layer units. The multiprotocol interface also includes a physical layer receiver unit configured to receive data and to deliver the received data to the synchronous media access control layer units and the asynchronous media access control layer units.

In one embodiment, the physical layer transmitter unit includes a synchronous clock synchronized to a transmit rate of data. The physical layer transmitter unit further includes an 8 b/10 b encoder coupled with the synchronous media access control layer units as inputs and the synchronous clock as a timing device. The physical layer transmitter unit also includes an asynchronous to synchronous conversion unit coupled with the asynchronous media access control layer units. In addition, the physical layer transmitter unit includes a multiplexer configured to select between the 8 b/10 b encoder and the asynchronous to synchronous conversion unit.

In one embodiment, the multiprotocol interface includes an asynchronous clock synchronized to any data rate other than the transmit data rate. The asynchronous to synchronous conversion unit is coupled with the asynchronous clock and the synchronous clock as timing devices.

In one embodiment, the multiprotocol interface includes a transmitter differential driver and a serializer. The multiplexer is coupled to output to the serializer, and the transmitter differential driver is coupled to receive the output of the serializer.

In one embodiment, the multiprotocol interface includes a synchronous clock synchronized to a transmit rate of data. The physical layer receiver unit further includes a deserializer configured to output to an elastic buffer unit in a synchronous mode and configured to output to a synchronous to asynchronous conversion unit in an asynchronous mode. The elastic buffer unit is coupled to output a synchronous version of the inputted signal to the 8 b/10 b decoder. The elastic buffer unit is further coupled to the synchronous clock as a timing device. The 8 b/10 b decoder unit is coupled with the synchronous media access control layer units as outputs and the synchronous clock as a timing device. The synchronous to asynchronous conversion unit is coupled with the asynchronous media access control layer units as outputs and configured to convert data at a recovered received clock rate to an asynchronous clock rate.

In one embodiment, the physical layer receiver unit further includes a clock recovery unit configured to generate the recovered received clock from the received data. The clock recovery unit is coupled as a timing device with the deserializer. A differential receiver is coupled to output to the deserializer and the clock recovery unit.

In one embodiment, the synchronous to asynchronous conversion unit is coupled with an asynchronous clock and a clock recovery unit as timing devices.

In one embodiment, the asynchronous media access control layer units transmit and receive data according to the Interlaken protocol. The data are Interlaken packets.

In another embodiment, the physical layer transmitter unit and the physical layer receiver unit are both configured to operate in either an asynchronous mode or a synchronous mode. The physical layer transmitter unit and the physical layer receiver unit transmit and receive only with the asynchronous media access control units, and physical layer transmitter unit and the physical layer receiver unit transmit and receive only with the synchronous media access control units.

A method for interfacing with multiple protocols includes, in a physical layer transmitter unit, transmitting data from synchronous media access control layer units and asynchronous media access control layer units. The method further includes, in a physical layer receiver unit, receiving data, and delivering the received data to the synchronous media access control layer units and the asynchronous media access control layer units.

The method further comprises maintaining a synchronous clock synchronized to a transmit rate of data, encoding data from the synchronous media access control layer units with an 8 b/10 b encoding scheme using the synchronous clock as a timing device, converting the output of the asynchronous media access control layer units to a synchronous output, and selecting, in a multiplexer, between the encoded data and the synchronous output.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments follows.

Before describing example embodiments in detail, an example network security processor in which the embodiments may be implemented is described immediately below to help the reader understand inventive features.

Figure 1:
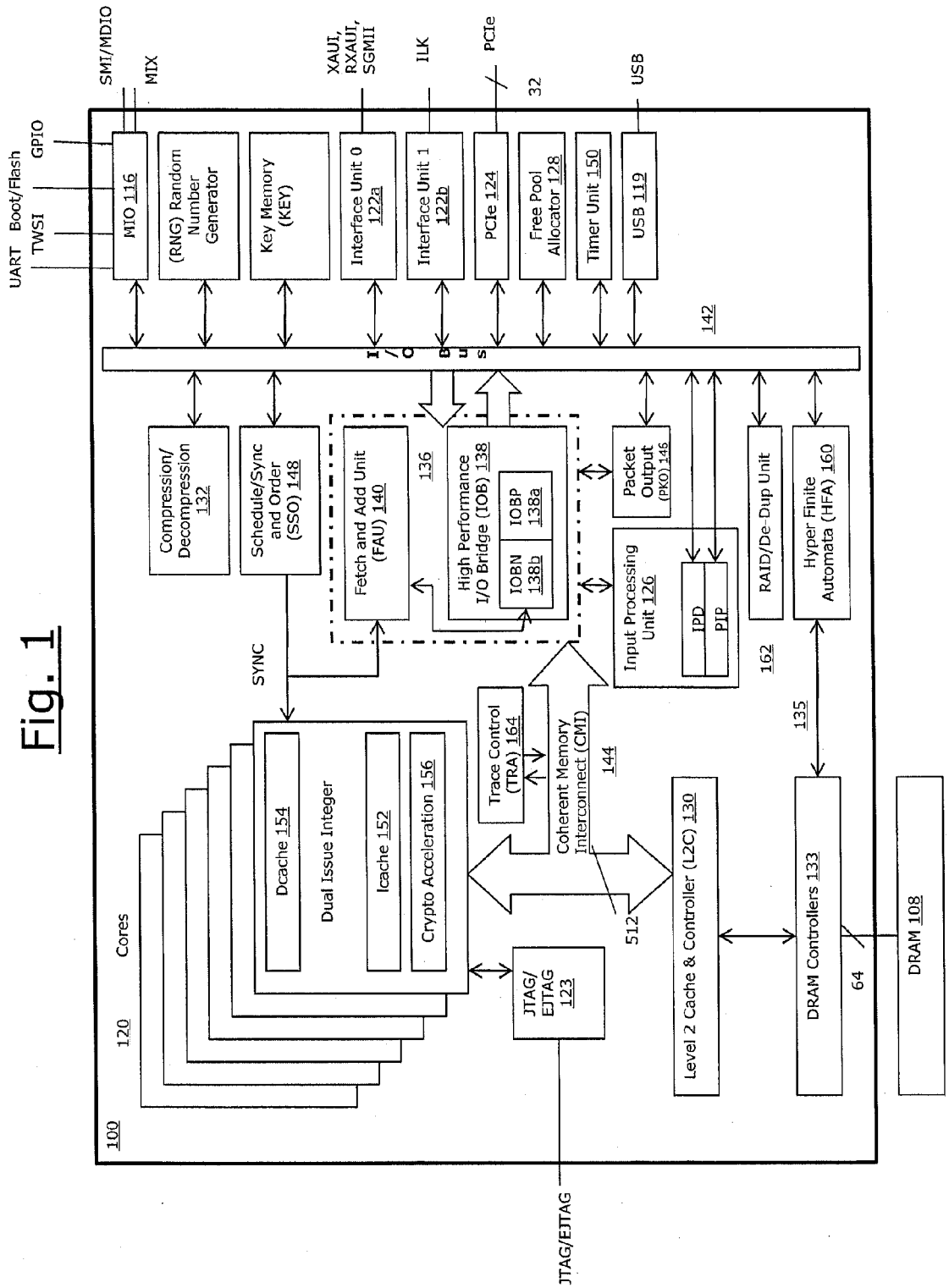
FIG. 1 is a block diagram showing a network services processor.

FIG. 1 is a block diagram showing a network services processor 100. The network services processor 100 delivers high application performance using at least one processor core 120.

The network services processor 100 processes Open System Interconnection network L2-L7 layer protocols encapsulated in received packets. As is well-known to those skilled in the art, the Open System Interconnection (OSI) reference model defines seven network protocol layers (L1-L7). The physical layer (L1) represents the actual interface, electrical and physical that connects a device to a transmission medium. The data link layer (L2) performs data framing. The network layer (L3) formats the data into packets. The transport layer (L4) handles end to end transport. The session layer (L5) manages communications between devices, for example, whether communication is half-duplex or full-duplex. The presentation layer (L6) manages data formatting and presentation, for example, syntax, control codes, special graphics and character sets. The application layer (L7) permits communication between users, for example, file transfer and electronic mail.

The network services processor 100 may schedule and queue work (packet processing operations) for upper level network protocols, for example L4-L7, and allow processing of upper level network protocols in received packets to be performed to forward packets at wire-speed. Wire-speed is the rate of data transfer of the network over which data is transmitted and received. By processing the protocols to forward the packets at wire-speed, the network services processor does not slow down the network data transfer rate.

A packet is received for processing by a plurality of interface units 122a and 122b. A packet can also be received by a PCIe interface 124. The interface units 122a and 122b perform pre-processing of the received packet by checking various fields in the L2 network protocol header included in the received packet and then forward the packet to a packet input unit 126. At least one interface unit 122a can receive packets from a plurality of X Attachment Unit Interfaces (XAUI), Reduced X Attachment Unit Interfaces (RXAUI), or Serial Gigabit Media Independent Interfaces (SGMII). At least one interface unit 122b can receive connections from an Interlaken Interface (ILK).

The packet input unit 126 performs further pre-processing of network protocol headers (e.g., L3 and L4 headers) included in the received packet. The pre-processing includes checksum checks for TCP/User Datagram Protocol (UDP) (L3 network protocols).

A free-pool allocator 128 maintains pools of pointers to free memory in a Level 2 cache memory 130 and external DRAM 108. The Level 2 cache memory 130 can also include a controller. The packet input unit 126 uses one of the pools of pointers to store received packet data in the Level-2 cache memory 130 or external DRAM 108 and another of the pools of pointers to allocate work queue entries for the processor cores 120.

The packet input unit 126 then writes packet data into buffers in Level-2 cache memory 130 or external DRAM 108. Preferably, the packet data is written into the memories in a format convenient to higher-layer software executed in at least one of the processor cores 120. Thus, further processing of higher level network protocols is facilitated.

The network services processor 100 can also include one or more application specific co-processors. These co-processors, when included, offload some of the processing from the cores 120, thereby enabling the network services processor to achieve high-throughput packet processing. For example, a compression/decompression co-processor 132 is provided that is dedicated to performing compression and decompression of received packets. Other embodiments of co-processing units include the RAID/De-Dup Unit 162, which accelerates data striping and data duplication processing for disk-storage applications.

Another co-processor is a Hyper Finite Automata (HFA) unit 160 which includes dedicated HFA inspection engines adapted to accelerate pattern and/or signature matching necessary for anti-virus, intrusion-detection systems and other content-processing applications. Using a HFA Unit 160, pattern and/or signature matching is accelerated, for example being performed at rates upwards of multiples of tens of gigabits per second. The HFA Unit 160, in some embodiments, could include any of a Deterministic Finite Automata (DFA), Non-deterministic Finite Automata (NFA), or HFA inspection engine.

An I/O interface 136 manages the overall protocol and arbitration and provides coherent I/O partitioning. The I/O interface 136 includes an I/O bridge 138 and a fetch-and-add unit 140. The I/O Bridge includes two bridges, an I/O Packet Bridge (IOBP) 138a and an I/O Bus Bridge (IOBN) 138b. The I/O Packet Bridge 138a is configured to manage the overall protocol and arbitration and provide coherent I/O portioning with primarily packet input and output. The I/O Bus Bridge 138b is configured to manage the overall protocol and arbitration and provide coherent I/O portioning with primarily the I/O Bus. Registers in the fetch-and-add unit 140 are used to maintain lengths of the output queues that are used for forwarding processed packets through a packet output unit 146. The I/O bridge 138 includes buffer queues for storing information to be transferred between a coherent memory interconnect (CMI) 144, an I/O bus 142, the packet input unit 126, and the packet output unit 146.

The miscellaneous I/O interface (MIO) 116 can include auxiliary interfaces such as General Purpose I/O (GPIO), Flash, IEEE 804 two-wire Management Data I/O Interface (MDIO), Serial Management Interface (SMI), Universal Asynchronous Receiver-Transmitters (UARTs), Reduced Gigabit Media Independent Interface (RGMII), Media Independent Interface (MII), two wire serial interface (TWSI) and other serial interfaces.

The network services processor 100 may also include a Joint Test Action Group (JTAG) Interface 123 supporting the MIPS EJTAG standard. According to the JTAG and MIPS EJTAG standards, a plurality of cores within the network services processor 100 will each have an internal Test Access Port (TAP) controller. This allows multi-core debug support of the network services processor 100.

A Schedule/Sync and Order (SSO) module 148 queues and schedules work for the processor cores 120. Work is queued by adding a work queue entry to a queue. For example, a work queue entry is added by the packet input unit 126 for each packet arrival. A timer unit 150 is used to schedule work for the processor cores 120.

Processor cores 120 request work from the SSO module 148. The SSO module 148 selects (i.e., schedules) work for one of the processor cores 120 and returns a pointer to the work queue entry describing the work to the processor core 120.

The processor core 120, in turn, includes instruction cache 152, Level-1 data cache 154, and crypto acceleration 156. In one embodiment, the network services processor 100 includes 32 superscalar Reduced Instruction Set Computer (RISC)-type processor cores 120. In some embodiments, each of the superscalar RISC-type processor cores 120 includes an extension of the MIPS64 version 3 processor core. In one embodiment, each of the superscalar RISC-type processor cores 120 includes a cnMIPS II processor core.

Level-2 cache memory 130 and external DRAM 108 are shared by all of the processor cores 120 and I/O co-processor devices. Each processor core 120 is coupled to the Level-2 cache memory 130 by the CMI 144. The CMI 144 is a communication channel for all memory and I/O transactions between the processor cores 120, the I/O interface 136 and the Level-2 cache memory 130 and controller. In one embodiment, the CMI 144 is scalable to 32 processor cores 120, supporting fully-coherent Level 1 data caches 154 with write through. Preferably the CMI 144 is highly-buffered with the ability to prioritize I/O. The CMI 144 is coupled to a trace control unit 164 configured to capture bus requests so software can later read the request and generate a trace of the sequence of events on the CMI 144.

The Level-2 cache memory 130 and controller maintains memory reference coherence. It returns the latest copy of a memory block for every fill request, whether the block is stored in Level-2 cache memory 130, in external DRAM 108, or is "in-flight." It also stores a duplicate copy of the tags for the data cache 154 in each processor core 120. It compares the addresses of cache-block-store requests against the data-cache tags, and invalidates (both copies) a data-cache tag for a processor core 120 whenever a store instruction is from another processor core or from an I/O component via the I/O interface 136.

In some embodiments, a plurality of DRAM controllers 133 supports up to 128 gigabytes of DRAM. In one embodiment, the plurality of DRAM controllers includes four DRAM controllers, each of the DRAM controllers 133 supporting 32 gigabytes of DRAM. Preferably, each DRAM controller 133 supports a 64-bit interface to DRAM 108. Additionally, the DRAM controller 133 can support preferred protocols, such as the DDR-III protocol.

After a packet has been processed by the processor cores 120, the packet output unit 146 reads the packet data from the Level-2 cache memory 130/DRAM 108, performs L4 network protocol post-processing (e.g., generates a TCP/UDP checksum), forwards the packet through the interface units 122a and 122b or the PCIe interface 124 and frees the Level-2 cache memory 130/DRAM 108 used by the packet.

The DRAM Controllers 133 manage in-flight transactions (loads/stores) to/from the DRAM 108. In some embodiments, the DRAM Controllers 133 include four DRAM controllers, the DRAM 108 includes four DRAM memories, and each DRAM controller is connected to a DRAM memory. The HFA Unit 160 is coupled directly to the DRAM Controllers 133 on a bypass-cache access path 135. The bypass-cache access path 135 allows the HFA Unit to read directly from the DRAM memory 108 without using the Level-2 cache memory 130, which can improve efficiency for HFA operations.

The Interlaken protocol has several distinct features over synchronous protocols. For example, the Interlaken protocol provides 64 b/67 b encoding and scrambling instead of 8 b/10 b encoding. The Interlaken protocol provides complex clock compensation because it has a MetaFrame size invariance requirement. In addition, it has a relaxed lane-to-lane transmit skew specification, where 67 unit intervals are allowed at PMA sublayer.

Figure 2:
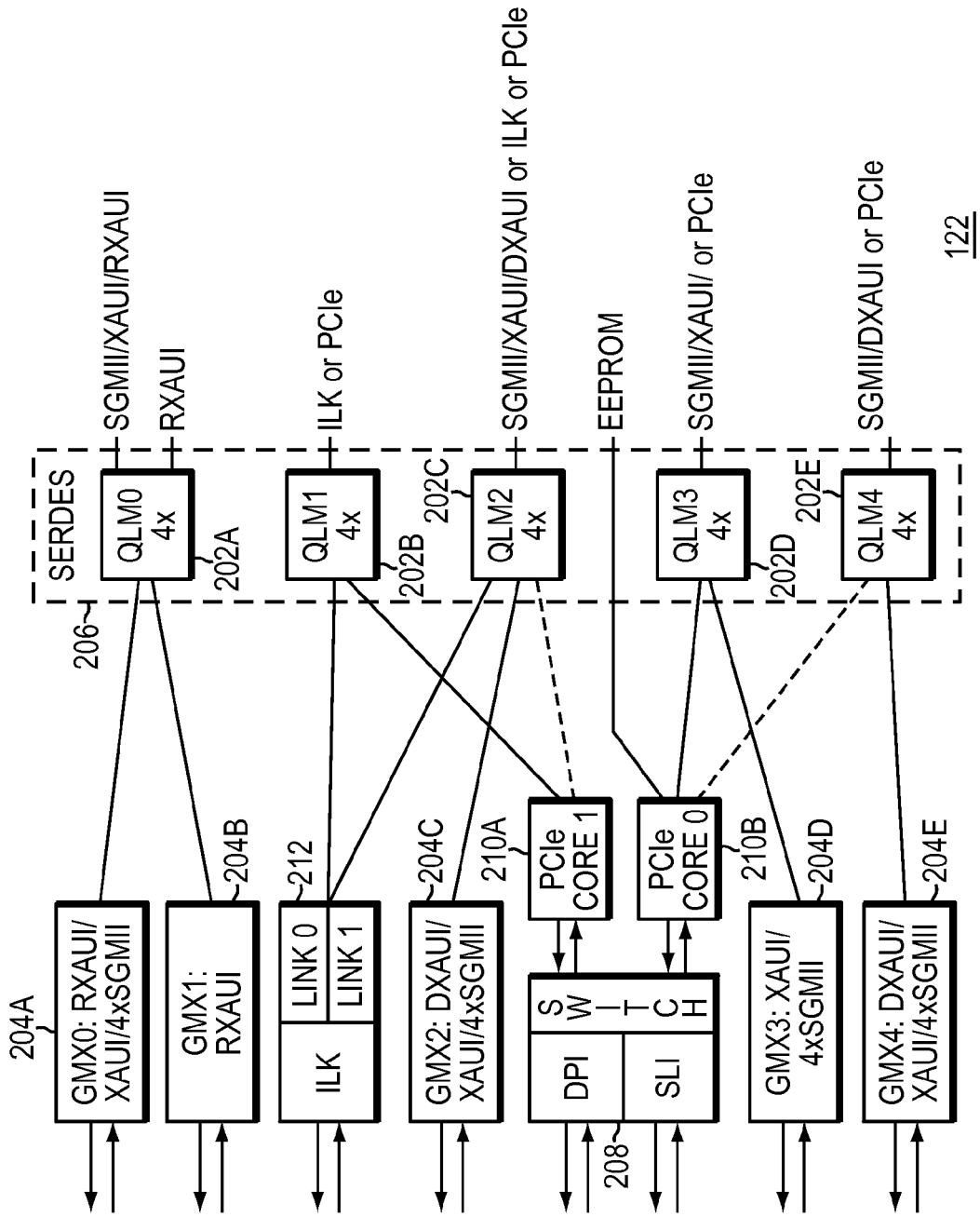
FIG. 2 is block diagram showing interface units.

FIG. 2 is block diagram showing the interface units 122. The interface units 122 include a plurality of quad-lane modules (QLMs) 202A-202E in a Serializer-Deserializer (SerDes) interface 206. The interface units 122 further includes a plurality of synchronous media access control (MAC) units 204A-204E and an asynchronous media access control (MAC) unit 212. In one embodiment, the asynchronous MAC unit 212 is an Interlaken interface. In some embodiments, the Interlaken interface is configured to receive or transmit along two links. The interface units 122 also include a Direct Memory Access (DMA) Packet Interface (DPI) / Switch Logic Interface (SLI) 208. The DPI/SLI 208 is coupled with at least one PCIe Core 210A-B.

The plurality of synchronous MAC units 204A-E, the asynchronous MAC unit 212, and the DPI/SLI 208 are coupled with the I/O Bus 142.

The synchronous MAC unit 204A is coupled with QLM 202A. The synchronous MAC unit 204B is also coupled with QLM 202A. The synchronous MAC unit 204C is coupled with QLM 202C. The synchronous MAC unit 204D is coupled with QLM 202D. The synchronous MAC unit 204E is coupled with QLM 202E.

The asynchronous MAC unit 212 is coupled with QLM 202B and QLM 202C. The DPI/SLI 208 is coupled with PCIe Cores 210A-210B. PCIe Core 210A is coupled with QLM 202B and 202C. PCIe Core 210B is coupled with QLM 202D and QLM 202E. PCIe Core 210B is also coupled with an electrically eraseable programmable read-only memory (EEPROM). The asynchronous MAC unit 212 includes a Physical Coding sublayer and a Physical Medium Attachment sublayer. In one embodiment, the asynchronous MAC unit 212 performs Interlaken-specific functionality.

Figure 3:
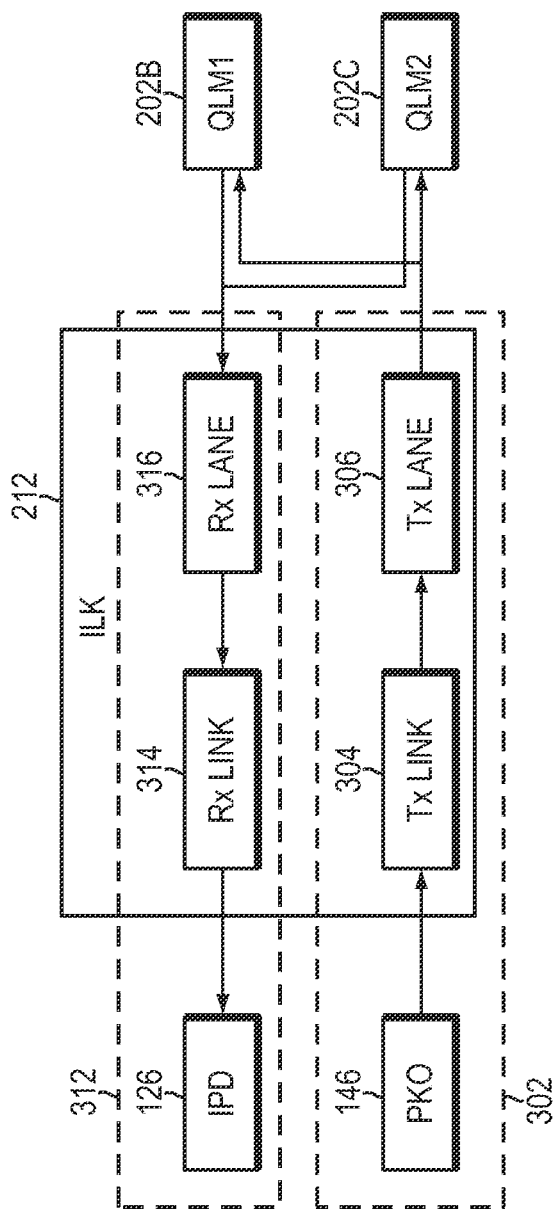
FIG. 3 is a block diagram showing an asynchronous MAC unit.

FIG. 3 is a block diagram showing the asynchronous MAC unit 212. The asynchronous MAC unit 212 includes a transmit path 302 and a receive path 312. The transmit path 302 inputs data from a packet output unit 146. The packet output unit 146 is coupled to transmit data to a transmit link unit 304. The transmit link unit 304 is coupled to transmit data to a transmit lane unit 306. Then, the transmit link transmits data to QLM 202B or QLM 202C.

The receive path 312 receives data from the QLMs 202B and 202C at receive lane 316. The receive lane transmits data to the receive link 314. The receive link transmits packets to the packet input unit 126.

Figure 4:
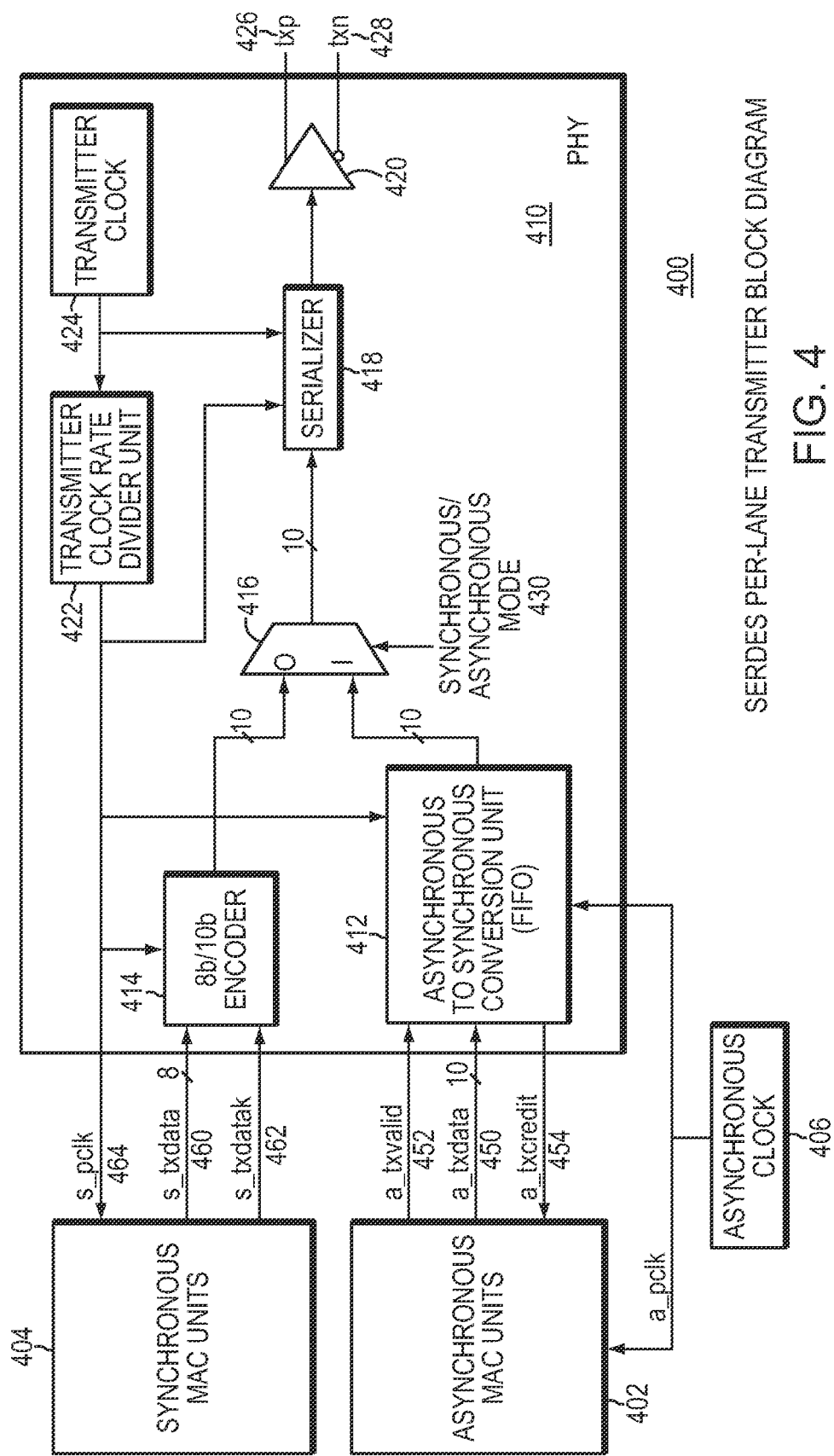
FIG. 4 is a block diagram showing a lane of a multiprotocol transmitter.

FIG. 4 is a block diagram showing a lane of a multiprotocol transmitter 400. The multiprotocol transmitter 400 includes at least one asynchronous MAC unit 402, at least one synchronous MAC unit 404, and a transmitter serializer unit 410. In one embodiment, the at least one asynchronous MAC unit 402 can be the asynchronous media access control (MAC) unit 212 of FIG. 2. In one embodiment, the synchronous MAC unit 404 can be the synchronous MAC units 204A-204E, or the DPI/SLI 208 coupled the PCIe Cores 210A-B of FIG. 2.

The transmitter serializer unit 410 includes an asynchronous to synchronous conversion unit 412, a transmitter clock 424 and a transmitter clock rate divider unit 422. The transmitter clock 424 is coupled with the transmitter clock rate divider unit 422. The transmitter clock rate divider unit 422 is configured to divide the clock rate of the transmitter clock 424. In one embodiment, the transmitter clock rate divider unit 422 is configured to divide the clock rate of the transmitter clock 424 by a factor of 10.

The asynchronous to synchronous conversion unit 412 is coupled with the asynchronous MAC unit 402, the transmitter clock rate divider unit 422 and an asynchronous clock 406. The asynchronous to synchronous conversion unit 412 is configured to receive data from the asynchronous MAC unit 402 along an asynchronous transmit data line 450, which is timed with the asynchronous clock 406. The asynchronous clock 406 is timed to any rate other than the rate of the transmitter clock 424. The asynchronous transmit data line 450 is a 10-bit segment of pre-encoded transmit data, driven by the asynchronous MAC unit 402. The asynchronous MAC unit 402 asserts an asynchronous transmit valid signal 452 when valid data is available on the asynchronous transmit data line 450. The asynchronous to synchronous conversion unit 412 asserts an asynchronous transmit credit 454 to the asynchronous MAC unit 402 after the asynchronous to synchronous conversion unit 412 consumes the data from the asynchronous transmit data line 450.

The asynchronous to synchronous conversion unit 412 outputs the same data according to the divided clock rate provided by the transmitter clock rate divider unit 422 in a first-in-first-out order. The asynchronous to synchronous conversion unit 412 inputs and outputs 10 parallel bits at a time.

The transmitter serializer unit 410 further includes an 8 b/10 b encoder unit 414. The 8 b/10 b encoder unit 414 is coupled with the synchronous MAC unit 404 and the transmitter clock rate divider unit 422. The 8 b/10 b encoder unit 414 is configured to receive data from the synchronous MAC unit 404 in 8-bit parallel segments from the synchronous transmit data line 460. The synchronous transmit data line 460 transmits one symbol, or 8-bits, of un-encoded transmit data and is driven by the synchronous MAC unit 404. The synchronous data unit also transmits a control bit 462, for 8 b/10 b encoding of data, from the synchronous transmit data line 460. The synchronous MAC unit 404 is also coupled with the transmitter clock rate divider unit 422 to receive a synchronous clock signal 464 that is 1/10th of the transmitted data rate.

The 8 b/10 b encoder unit 414 then encodes the received data from the synchronous transmit data line 460 according to the 8 b/10 b encoding scheme, which is well known in the art. The 8 b/10 b encoder unit 414 then outputs the encoded data according to the divided clock rate provided by the transmitter clock rate divider unit 422.

The transmitter serializer module 410 includes a multiplexer 416. The multiplexer is coupled to receive the 10-bit outputs of both the 8 b/10 b encoder 414 and the asynchronous to synchronous conversion unit 412. The multiplexer 416 is coupled with a synchronous/asynchronous mode signal 430 as a selection bit. In one embodiment, the synchronous/asynchronous mode signal 430 is set once at system startup. In this embodiment, the synchronous/asynchronous mode signal 430 does not change during system operation, and can only be changed during a restart. The multiplexer 416 selects the signal from the 8 b/10 b encoder 414 in a synchronous mode and selects the signal from the asynchronous to synchronous conversion unit 412 in an asynchronous mode.

The signal selected by the multiplexer 416 is transmitted to a serializer 418. The serializer is further coupled to the transmitter clock rate divider unit 422 and the transmitter clock 424. The serializer 418 receives a signal at the divided clock rate, and outputs individual bits of the 10-bit parallel signal it receives according to the transmitter clock 424. The serializer outputs the serialized signal to the differential driver 420. The differential driver 420 outputs two complementary signals, a positive transmit signal 426 and a negative transmit signal 428. As is known in the art, differential signaling reduces the effect on noise on a signal.

Figure 5:
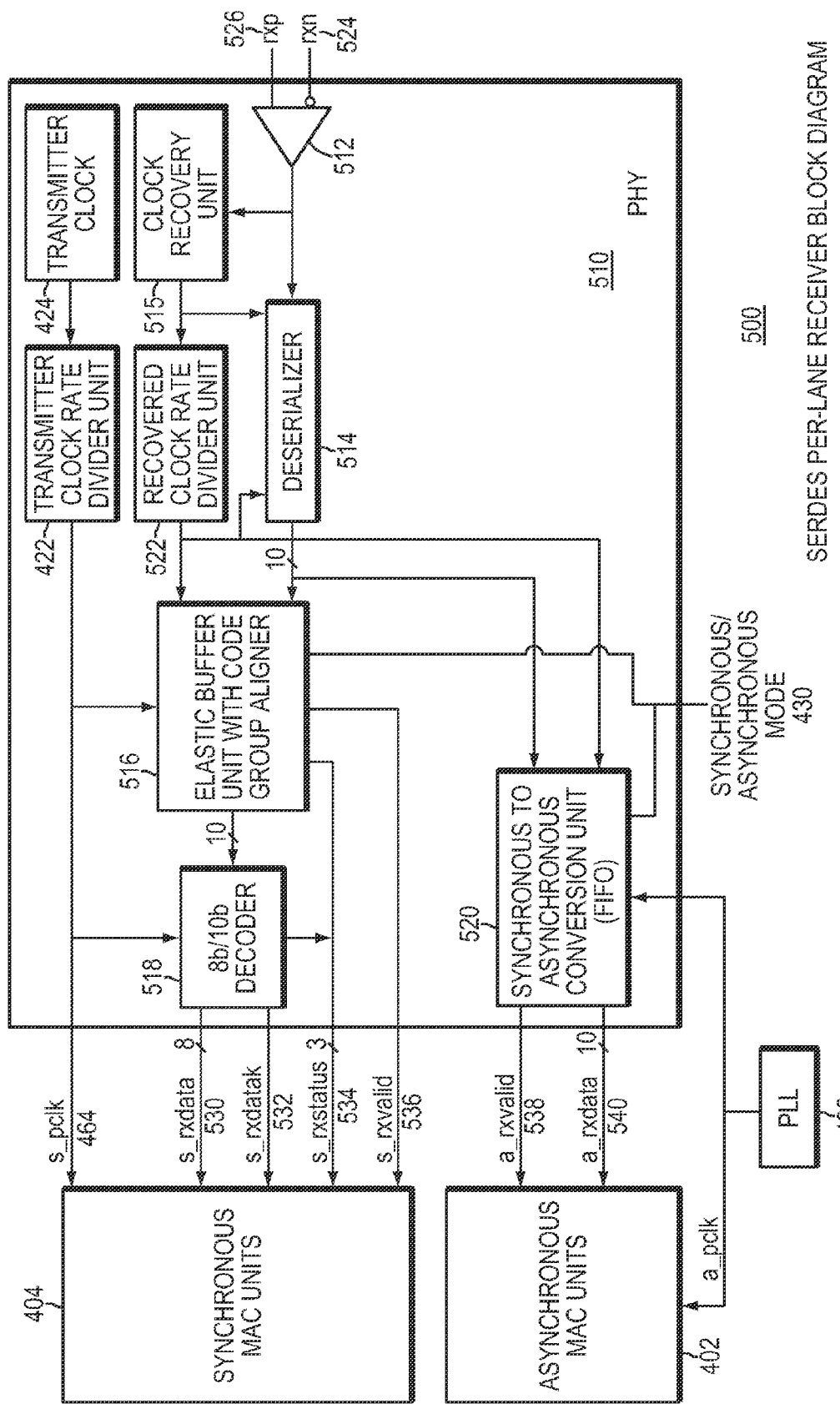
FIG. 5 is a block diagram showing a lane of a multiprotocol receiver.

FIG. 5 is a block diagram showing a lane of a multiprotocol receiver 500. The multiprotocol receiver 500 includes at least one asynchronous MAC unit 402, at least one synchronous MAC unit 404, and a receiver serializer module 510. In one embodiment, the at least one asynchronous MAC unit 402 can be the asynchronous media access control (MAC) unit 212 of FIG. 2. In one embodiment, the synchronous MAC unit 404 can be the synchronous MAC units 204A-204E, or the DPI/SLI 208 coupled the PCIe Cores 210A-B of FIG. 2.

The receiver serializer module includes a differential receiver 512 which receives a positive receive signal 526 and a negative receive signal 524. The differential receiver 512 processes the positive receive signal 526 and negative receive signal 524 and outputs a single signal, using differential signaling techniques well known in the art. The differential receiver 512 is coupled to output to a deserializer 514 and a clock recovery unit 515.

The clock recovery unit 515 generates a clock signal from the output signal. The generated clock signal may be different from the transmitter clock 424. The clock recovery unit 515 is coupled with a recovered clock rate divider unit 522. The recovered clock rate divider unit 522 is configured to divide the clock rate of the recovered clock rate outputted by the clock recovery unit 515.

The deserializer 514 is also coupled with the clock recovery unit 515 and the recovered clock rate divider unit 522. The deserializer 514 synchronizes each bit with each clock tick from the clock recovery unit 515, and then outputs a parallel 10-bit segment for each clock tick from the recovered clock rate divider unit 522.

The deserializer 514 is coupled to output to both the elastic buffer unit 516 and the synchronous to asynchronous conversion unit 520. Both the elastic buffer unit 516 and the synchronous to asynchronous conversion unit 520 are coupled to a synchronous/asynchronous mode signal 430. While the deserializer 514 is connected to directly output to both the elastic buffer unit 516 and the synchronous to asynchronous conversion unit 520, the elastic buffer unit 516 is only enabled in synchronous mode and the synchronous to asynchronous conversion unit is only enabled in asynchronous mode. In this manner, the deserializer 514 only outputs to one of a synchronous data path or an asynchronous data path.

The elastic buffer unit 516 is coupled to receive the output of the deserializer 514, the output of the recovered clock rate divider unit 522, and the output of the transmitter clock rate divider unit 422. The elastic buffer unit is configured to buffer and realign the deserialized data from the divided recovered clock rate to the divided clock rate outputted from the transmitter clock rate divider unit 422. The elastic buffer unit 516 includes a code group alignment unit (not shown) configured to determine the beginning of each 10-bit block to be outputted to the 8 b/10 b decoder 518. The elastic buffer unit outputs 10-bit segments to the 8 b/10 b decoder 518.

The 8 b/10 b decoder 518 decodes the 10-bit segment according to the 8 b/10 b decoding scheme, which is well known in the art. The 8 b/10 decoder 518 then outputs an 8-bit segment to a synchronous receive data line 530 and a synchronous receive control bit 532 to the synchronous MAC unit 404. Further, the elastic buffer unit 516 asserts, to the synchronous MAC unit 404, a received valid data signal 538 when valid data is available on both the synchronous receive data line 530 and the synchronous receive control bit 532 and when a code group is aligned. The elastic buffer unit 516 also outputs, to the synchronous MAC unit 404, a synchronous receive status 534, which encodes the receiver status and possible error conditions. The statuses and error conditions can include "received data ok," "SKiP (SKP) symbol added," "SKiP (SKP) symbol removed," "8 b/10 b decode error," "elastic buffer overflow," "elastic buffer underflow," and "8 b/10 b disparity error." The synchronous MAC unit 404 further receives the synchronous clock signal 464 from the transmitter clock rate divider unit 422 to synchronize all synchronous signals to the synchronous clock signal 464.

The synchronous to asynchronous conversion unit 520 is coupled to receive input from the deserializer 514, the recovered clock rate divider unit 522, and the asynchronous clock 406. The synchronous to asynchronous conversion unit 520 converts the deserialized signal of the deserializer 514 from being synchronized to the divided recovered clock from the recovered clock rate divider unit 522 to being synchronized to the asynchronous clock 406. The synchronous to asynchronous conversion unit 520 outputs asynchronous received data, which is an encoded 10-bit segment, to the asynchronous MAC unit 402. The synchronous to asynchronous conversion unit 520 also asserts, to the asynchronous MAC unit 402, an asynchronous received valid data bit 538 when valid data is available on the asynchronous received data line 540. The asynchronous MAC unit 402 is coupled with the asynchronous clock 406 to synchronize all asynchronous signals.

Therefore, the above described system provides compatibility with asynchronous protocols, such as the Interlaken protocol, as well as synchronous SerDes interfaces, such as PCI Express, Serial RapidIO, SGMII, and XAUI.

This system transfers much of the Interlaken-specific PCS/PMA functionality from the multi-protocol PHY into the asynchronous MAC unit responsible for Interlaken MAC functions. However, using this system, an asynchronous MAC unit utilizing Interlaken can use the same PHY block as a synchronous MAC unit.

The transmit interface begins with a MAC block that sends 10 bits of 64 b/67 b pre-encoded/pre-scrambled data on the system clock using a credit/debit scheme. The transmit interface's PHY block converts the 10 parallel bits of data from being synchronized to the asynchronous clock being synchronized to the transmitter clock. The transmit interface's PHY block then converts 10 parallel bits to 10 serial bits and transmits them with a high-speed differential driver. The asynchronous clock should run higher than the speed of the interface clock, which is 625 Mhz in one embodiment, to prevent underflows in a clock conversion data buffer.

The receive interface's PHY block receives serial data using a high-speed differential receiver. Then, the receive interface's PHY block converts the received serial data to segments and recovers the received data's clock signal. The receive interface's PHY block converts 10 bits of 64 b/67 b encoded/scrambled data from a divided-by-10 recovered received data clock to the asynchronous clock and transmits the data to the MAC block along with a valid bit. The asynchronous clock replaces explicit clock compensation to the transmitter clock, which also avoids globally routing the transmitter clock. The asynchronous clock should run higher than the speed of the interface clock, which is 625 Mhz in one embodiment, to prevent underflows in a clock conversion data buffer.

A person of ordinary skill in the art will appreciate that in some embodiments the transmitter clock is an interface clock or a synchronous clock. A person of ordinary skill in the art will also appreciate that in some embodiments the asynchronous clock is a system clock.

While this invention has been particularly shown and described with references to example embodiments thereof, it will be understood by those skilled in the art that various changes in form and details may be made therein without departing from the scope of the invention encompassed by the appended claims.

What is claimed is:

1. A multiprotocol interface comprising:
   a physical layer transmitter unit configured to transmit data from at least one of one or more synchronous media access control layer units and one or more asynchronous media access control layer units; and
   a physical layer receiver unit configured to receive data and to deliver the received data to at least one of the one or more synchronous media access control layer units and the one or more asynchronous media access control layer units.

2. The multiprotocol interface of claim 1, wherein the physical layer transmitter unit further comprises:
   a synchronous clock synchronized to a transmit rate of data;
   an 8 b/10 b encoder coupled with the one or more synchronous media access control layer units as inputs and the synchronous clock as a timing device;
   an asynchronous to synchronous conversion unit coupled with the one or more asynchronous media access control layer units; and
   a multiplexer configured to select between the 8 b/10 b encoder and the asynchronous to synchronous conversion unit.

3. The multiprotocol interface of claim 2, further comprising an asynchronous clock, the asynchronous clock synchronized to any data rate other than the transmit data rate, wherein the asynchronous to synchronous conversion unit is coupled with the asynchronous clock and the synchronous clock as timing devices.

4. The multiprotocol interface of claim 2, further comprising:
   a transmitter differential driver; and
   a serializer, wherein the multiplexer is coupled to output to the serializer, and the transmitter differential driver is coupled to receive the output of the serializer.

5. The multiprotocol interface of claim 1, wherein the physical layer receiver unit further comprises:
   a synchronous clock synchronized to a transmit rate of data; and
   a deserializer configured to output to an elastic buffer unit in a synchronous mode and configured to output to a synchronous to asynchronous conversion unit in an asynchronous mode, the elastic buffer unit coupled to output a synchronous version of the inputted signal to an 8 b/10 b decoder, the elastic buffer unit further coupled to the synchronous clock as a timing device, the 8 b/10 b decoder unit coupled with the one or more synchronous media access control layer units as outputs and the synchronous clock as a timing device, the synchronous-to-asynchronous conversion unit coupled with the one or more asynchronous media access control layer units as outputs and configured to convert data at a recovered received clock rate to an asynchronous clock rate.

6. The multiprotocol interface of claim 5, further comprising:
   a clock recovery unit configured to generate the recovered received clock from the received data, the clock recovery unit coupled, as a timing device, with the deserializer; and
   a differential receiver coupled to output to the deserializer and the clock recovery unit.

7. The multiprotocol interface of claim 5, wherein the synchronous to asynchronous conversion unit is coupled with an asynchronous clock and a clock recovery unit as timing devices.

8. The multiprotocol interface of claim 1, wherein the one or more asynchronous media access control layer units are configured to transmit and receive data according to an Interlaken protocol, wherein the transmitted and received data are Interlaken packets.

9. The multiprotocol interface of claim 1, wherein the physical layer transmitter unit and the physical layer receiver unit are both configured to operate in either an asynchronous mode or a synchronous mode, where, in the asynchronous mode, the physical layer transmitter unit and the physical layer receiver unit transmit and receive only with the one or more asynchronous media access control units, and, in the synchronous mode, the physical layer transmitter unit and the physical layer receiver unit transmit and receive only with the one or more synchronous media access control units.

10. A method for interfacing with multiple protocols comprising:
  in a physical layer transmitter unit:
    transmitting data from at least one of one or more synchronous media access control layer units and one or more asynchronous media access control layer units; and
  in a physical layer receiver unit:
    receiving data, and delivering the received data to at least one of the one or more synchronous media access control layer units and the one or more asynchronous media access control layer units.

11. The method of claim 10, wherein the physical layer transmitter unit further comprises:
  maintaining a synchronous clock synchronized to a transmit rate of data;
  encoding data from the one or more synchronous media access control layer units with an 8 b/10 b encoding scheme using the synchronous clock as a timing device;
  converting the output of the one or more asynchronous media access control layer units to a synchronous output;
  selecting, in a multiplexer, between the encoded data and the synchronous output.

12. The method of claim 11, further comprising maintaining an asynchronous clock, the asynchronous clock synchronized to any data rate other than the transmit data rate, wherein converting the output of the one or more asynchronous media access control layer units to a synchronous output bases the timing of the synchronous output on the synchronous clock.

13. The method of claim 11, further comprising
  serializing the selected output; and
  differentially driving the serialized output.

14. The method of claim 10, wherein the physical layer receiver unit further comprises:
  maintaining a synchronous clock synchronized to a transmit rate of data;
  receiving data;
  deserializing the data;
  in a synchronous mode:
    buffering data along a data decoding path and synchronizing the buffered data with the synchronous clock, decoding the buffered data along the data decoding path using an 8 b/10 b decoding scheme and the synchronous clock as a timing device, and outputting the decoded data to the one or more synchronous media access control layer units; and
  in an asynchronous mode:
    converting the data along a synchronous-to-asynchronous conversion path to an asynchronous signal timed with an asynchronous clock, and outputting the asynchronous signal to the one or more asynchronous media access control units.

15. The method of claim 14, further comprising:
  recovering clock information from the received data; and
  deserializing the data by synchronizing the data to the recovered clock information.

16. The method of claim 15, wherein converting the received data along the synchronous-to-asynchronous conversion path converts the received data from being timed to the recovered clock information to being an asynchronous signal timed with an asynchronous clock.

17. The method of claim 10, wherein the one or more asynchronous media access control layer units are configured to transmit and receive data according to an Interlaken protocol, wherein the transmitted and received data are Interlaken packets.

18. The method of claim 10, wherein the physical layer transmitter unit and the physical layer receiver unit are both configured to operate in either an asynchronous mode or a synchronous mode, where, in the asynchronous mode, the physical layer transmitter unit and the physical layer receiver unit transmit and receive only with the one or more asynchronous media access control units, and in the synchronous mode, the physical layer transmitter unit and the physical layer receiver unit transmit and receive only with the one or more synchronous media access control units.

* * * * *